United States Patent Office 2,724,083
Patented Nov. 15, 1955

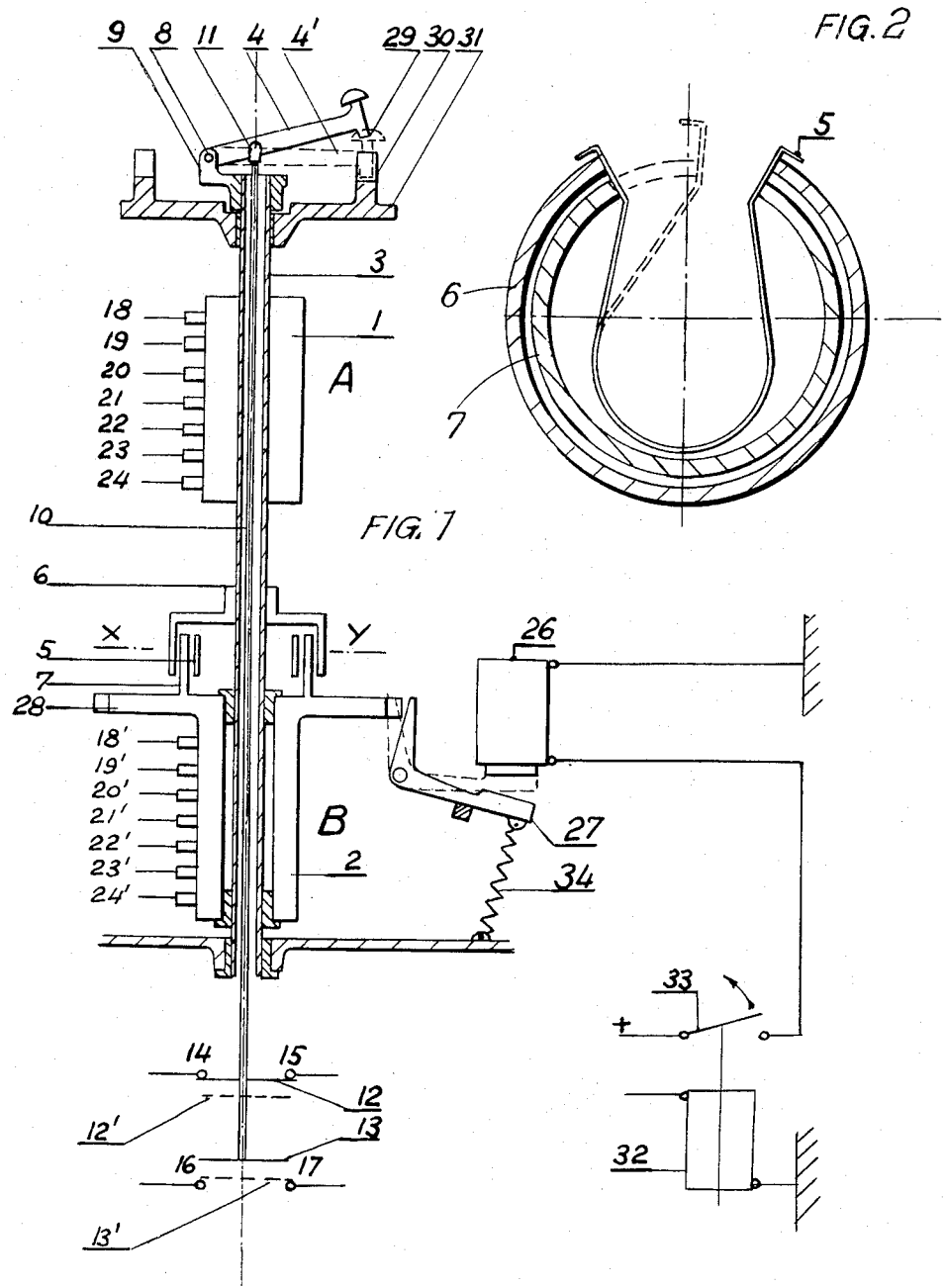

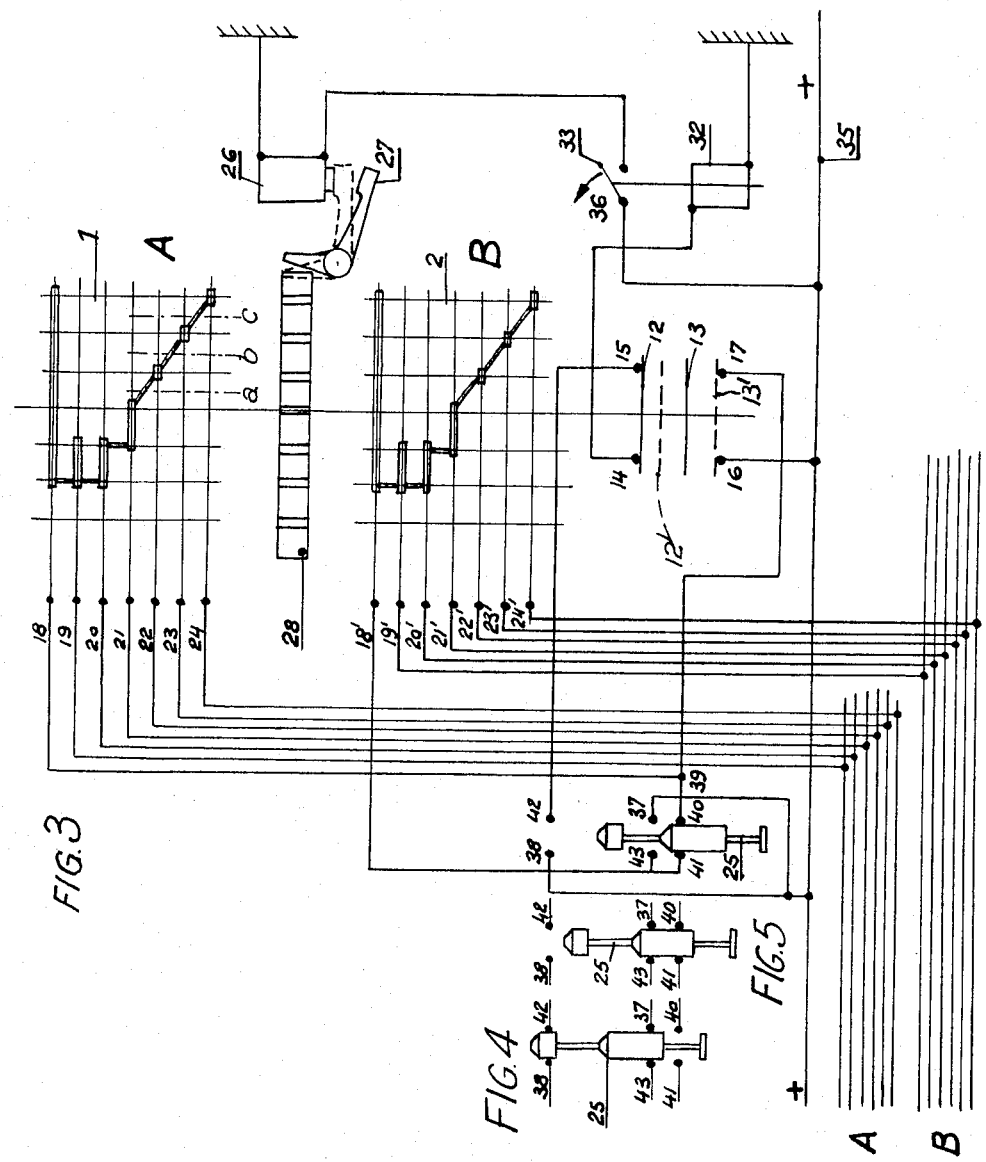

2,724,083

ELECTRIC CONTROL SYSTEMS

Léon Saives, Billancourt, France, assignor to Regie Nationale des Usines Renault, Billancourt, France Application May 8, 1953, Serial No. 353,758

Claims priority, application France June 30, 1952

9 Claims. (Cl. 318—546)

The present invention relates to a control system common to several machines or sets of machines, making it possible to cause these machines or sets of machines to perform the same operation either simultaneously or with a predetermined time-delay. This system is intended particularly for governing sets of motors in road or rail vehicles.

A specific embodiment of the invention will now be described by way of example with reference to the accompanying drawings in which:

Figure 1 is a section in elevation of a master controller;

Figure 2 is an enlarged transverse section on the line X—Y in Figure 1;

Figure 3 is a circuit diagram of the device; and

Figures 4 and 5 are fragmentary views of a portion of the circuit shown in Fig. 3, but with a push button shown in different positions.

Figure 1 shows a control unit for two sets of machines A and B. The sets A and B are controlled electrically by means of two drums 1 and 2 mounted in a common controller. The drum 1 is fixed on a shaft 3 governed by a hand-lever 4. The drum 2 is mounted loose on the shaft 3. The drums 1 and 2 are resiliently connected for rotation by means of a spring 5 which constantly tends to bring the two cylindrical portions 6 and 7, of the drums 1 and 2 respectively, into coincidence as indicated by hatching in the section X—Y shown in Figure 2.

It will be seen, by studying this figure that, if one of the parts 6 or 7 is displaced in relation to the other, the spring 5 will be put under tension and tends to restore the two parts 6 and 7 to their original relative position represented by the hatching on the section. The hand-lever 4 is movable about a pin 8 mounted in the crank boss 9 fixed to the shaft 3. The movement of the hand-lever 4 about the pin 8 can cause it to occupy two positions 4 and 4'. In this movement, a rod 10, connected to the hand-lever 4 by means of the pin 11, actuates an electric switch consisting of two contacts 12 and 13 which, in the upper position, shown in full lines, establish contact between the two studs 14 and 15, and their lower position (in broken lines 12', 13') establish contact between the two studs 16 and 17. The connections given by these studs will be explained later on with reference to Figure 3. The two drums 1 and 2 are designed as normal electric controller drums and are shown at A and B in Figure 3. Brushes 18, 19, 20, 21, 22, 23, 24, 18', 19', 20', 21', 22', 23' and 24' bear against the drums 1 and 2 and are connected in the manner shown in this figure. The control works on the following principle:

In one position of a push-button switch 25 as shown in Fig. 3 the groups A and B are controlled simultaneously, in other words, any movement of the main drum A involves that of the drum B by means of the springs 5 which connect these drums together. On the other hand, when the push-button 25 occupies the position shown in Figure 4, and the hand-lever 4 is raised, the connection of the studs 14 and 15 results in the energising, through a relay 32, of a solenoid 26 acting on a locking device 27, which locks a grooved disc 28, carried by the drum B (Figure 1). Now if the shaft 3 is caused to rotate, the drum A will follow this movement immediately, but the drum B will be kept in position by the locking device 27, and the spring 5 will be put under tension. In order to retain the new position selected for the hand-lever 4, this lever is then lowered to 4' so as to engage the end 29 of this lever in a notch 30 carried by a ring 31 fixed to the frame of the controller. As the hand-lever 4 is lowered, the contacts 12 and 13 take up the positions 12' and 13'. The studs 14 and 15 are separated and the studs 16 and 17 are brought into contact. The effect of this is to de-energise the relay 32, the contact 33 of which having a delayed opening will interrupt, after a predetermined time, the current energising the solenoid 26 of the locking device 27. When this solenoid 26 is de-energised the locking device 27, urged back by a spring 34, will release the notched disc 28, and the spring 5, as it is released, will force the drum B to occupy the same rotational position as the drum A.

Figure 3 shows, by way of a non-limiting example, the connections making it possible to carry out the simultaneous and delayed operations mentioned above, for two sets of machines A and B. The drums 1 and 2 are shown developed, each comprising contacts on which the brushes 18, 19, 20, 21, 22, 23, 24, 18', 19', 20', 21', 22', 23' and 24' will bear. The current (for example positive) is supplied via a wire 35 which feeds the studs 36, 16, 37 and 38 direct.

The operation of the apparatus will first be described in the position of the push-button 25, shown in Fig. 3, in which the two sets A and B, obey the master controller simultaneously. Then the hand-lever 4 is lowered, the contacts 12 and 13 take up the positions shown in dotted lines in Figures 1 and 3. It will then be seen that the current arriving at 16 passes through 17, 39, 18, 40, 41 and 18'. The contact rings of the two drums 1 and 2 are then connected to the current supply and, according to the position occupied by these drums, the brushes 19 to 24—19' to 24', or some of them only, are fed. The two machines A and B then perform the same operation simultaneously corresponding to this position of the controller. When it is desired to change the position of the controller, for example to change gear when the controller governs a change-speed gear, the hand-lever is first raised to the position 4, which has the effect of interrupting at 16 and 17 the current feed to the contact rings corresponding to the brushes 18 and 18'. This will be called the dead point. At this moment, the studs 14 and 15 are connected by the contact 12, but this connection remains ineffective because the push-button 25 is not establishing contact between 38 and 42 for the feed of the current. It is obvious that any rotational movement given to the drum A will be repeated by the drum B as a result of the initial tension of the springs 5.

The operation of the delayed control is obtained by pushing the push-button 25 to the position shown in Fig. 4. First of all let it be assumed that the hand-lever is down at 4', that is to say that the groups A and B are performing the same operation. In order to make them perform another operation, it is necessary to raise the hand-lever 4, turn it through a certain angle, and re-engage it. As soon as the hand-lever 4 is raised, the current is cut off between 16 and 17 and ceases to reach the brush 18, the drum 1 therefore controls the setting of the set A at the dead point. Nevertheless the current continues to reach the brush 18' by means of the studs 37 and 43 which are now connected by the push-button, but the raising of the hand-lever 4 has had the effect of bringing 14 and 15 into contact and exciting the relay 32, instantaneously sending the current to the solenoid 26 closing the lock 27. Thus even before it had caused the controller to make a rotational movement, the drum B is locked in the position which it occupies. The hand-lever 4 is now turned to the position corresponding to the new operation required (for example the new gear-selection position of the machines), and the lever is lowered to the position 4'. The contacts 16 and 17 are connected again, the current reaches the brush 18 which again feeds positive current to the drum 1, which has the effect of initiating the new operation selected. At this moment, the connection is broken between 14 and 15, which de-energises the relay 32, the opening of which takes place after a certain time by means of the delayed opening contact 33. Thus at the end of a certain time, which is predetermined, the current will be interrupted by this contact 33 in the solenoid 26; the lock 27 will release the disc 28 of the drum 2, which will be brought by the spring 5 into a position corresponding to that of the drum 1.

It will be seen, therefore, that for the delayed position of the push-button 25, shown in Fig. 4, the current is interrupted at 18 each time the hand-lever is raised, although it is not interrupted at 18' (the dead point of the equipment B will be when the line of the brushes 18' to 24' passes through intermediate positions a, b, c, between the studs of the drums 2). It goes without saying that the circuits of the solenoids 32 and 26 return via earth to the current supply source.

Fig. 5 shows the intermediate position occupied by the push-button 25 between the position shown in Fig. 3 corresponding to the simultaneous control of the sets A and B and the position Fig. 4 corresponding to the delayed control of these same sets. In the position shown in Fig. 5, it will be seen that before bringing the studs 38 and 42 into contact, and breaking the contact between the studs 40 and 41, the push-button establishes contact between the studs 43 and 37 arranged in the conductor connecting the brush 18' directly to the current supply line 35, so as not to interrupt the supply of current to the brush 18' when the contact 13 leaves the position 13', which would have the effect of bringing the different sets A, B, etc. to the dead point at the wrong time.

Although the control device according to the invention has been described as applied to a system employing two contact drums it is obvious that it could be applied to a system employing a greater number of drums.

I claim:

1. An electric control device for controlling a plurality of machines to cause them to perform the same operations either simultaneously or with a predetermined time lag, comprising a control shaft, means for rotating said control shaft, a first control drum fixed on said shaft, electrical connections from said first control drum to a first machine, a second control drum, electrical connections from said second control drum to a second machine, resilient coupling means connecting said second drum with said first drum and normally causing said drums to rotate together, operator-controlled means for locking said second drum in position while said first drum is turned to a new position, and time-delay means for releasing said second drum after a predetermined time lag, whereupon said second drum is moved by said resilient coupling to a new position corresponding to said new position of said first drum.

2. An electric control device for controlling a plurality of machines to cause them to perform the same operations either simultaneously or with a predetermined time lag, comprising a control shaft, a handle for turning said shaft, a first control drum fixed on said shaft, electrical connections from said first control drum to a first machine, a second control drum rotatable on said shaft, electrical connections from said second control drum to a second machine, elastic coupling means connecting said second drum with said first drum and normally causing said drums to rotate together, electromagnetic latch means for locking said second drum in fixed position while said first drum is turned by said shaft and handle to a new position, and time-delay means for releasing said second drum after a predetermined time lag, whereupon said second drum is moved by said elastic coupling to a new position corresponding to said new position of said first drum.

3. A control device according to claim 2, in which a notched disc is fixed on said second drum and said latch means engages said disc to hold said disc and thereby said drum against turning in either direction.

4. In a control device according to claim 2, a control circuit for said electromagnetic latch comprising means for supplying current and connections from said current-supplying means to said electromagnetic latch including an operator-controlled switch and a time-delay relay.

5. A control device according to claim 4, in which said operator-controlled switch also comprises contacts controlling the supply of current to said second drum.

6. A control device according to claim 4, in which said handle is movable axially of said shaft and in which said control circuit further includes a switch operable by the axial movement of said handle and connected in series with said operator-controlled switch.

7. A control device according to claim 6, in which said handle-operable switch further comprises contacts controlling the supply of current to said first drum.

8. An electric control device for controlling a plurality of machines to cause them to perform the same operations either simultaneously or with a predetermined time lag, comprising a rotatable control shaft, a handle for turning said shaft, said handle being rotatable about the axis of said shaft and also movable axially of said shaft, a first control drum fixed to said shaft, electrical connections from said first control drum to a first machine, a second control drum, electrical connections from said second control drum to a second machine, elastic coupling means connecting said second drum with said first drum and normally causing said drums to rotate together, electromagnetic latch means for locking said second drum in fixed position while said first drum is turned by said shaft and handle to a new position, a time-delay relay having contacts and a coil, a switch connected to said handle and operable by axial movement of said handle, said switch having a first pair of contacts which are closed when said switch is in a first position and a second pair of contacts which are closed when said switch is in a second position, an operator-controlled switch having a first pair of contacts which are closed when said operator-controlled switch is in a first position and a second pair of contacts which are closed when said operator-controlled switch is in a second position, electrical connections from a supply through said first pair of contacts of said handle-operable switch to said first control drum, electrical connections from said first drum through said first pair of contacts of said operator-controlled switch to said second drum, electrical connections from the supply through the contacts of said time-delay relay to said electromagnet latch means and electrical contacts from the supply through said second pair of contacts of said handle-operated switch and said second pair of contacts of said operator-controlled switch to the coil of said time-delay relay.

9. A control device according to claim 8, in which said operator-controlled switch has a third pair of contacts and in which there are electrical connections from the supply through said third pair of contacts to said second drum, said third pair of contacts being closed before said first pair of contacts of the operator-controlled switch is opened when said switch is moved from said first position to said second position.

References Cited in the file of this patent

UNITED STATES PATENTS

| | | |
|---|---|---|
| 702,427 | Henry | June 17, 1902 |
| 1,173,283 | Harris | Jan. 5, 1915 |
| 1,404,255 | Adams | Jan. 24, 1922 |
| 2,009,383 | Blume | July 30, 1935 |